United States Patent [19]

Tao

[11] Patent Number: 5,717,566
[45] Date of Patent: Feb. 10, 1998

[54] SHADE DEVICE FOR NOTEBOOK COMPUTER DISPLAY SCREEN

[75] Inventor: Adam M. Tao, Laguna Niguel, Calif.

[73] Assignee: Toshiba America Information Systems, Inc., Irvine, Calif.

[21] Appl. No.: 637,924

[22] Filed: May 1, 1996

[51] Int. Cl.[6] .............................. G06F 1/16; H04N 5/64
[52] U.S. Cl. .......................... 361/681; 348/834; 359/601
[58] Field of Search ................................ 361/681, 682, 361/683; 400/713, 714; 364/708.1; 348/834, 818, 823; 359/601, 610, 612

[56] References Cited

U.S. PATENT DOCUMENTS

| | | | |
|---|---|---|---|
| 3,733,436 | 5/1973 | Rose | 178/7.82 |
| 4,444,465 | 4/1984 | Giulie et al. | 350/276 |
| 4,863,242 | 9/1989 | Correa | 350/276 |
| 5,101,298 | 3/1992 | Lentz et al. | 359/612 |
| 5,218,474 | 6/1993 | Kirschner | 359/601 |
| 5,325,970 | 7/1994 | Dillon et al. | 206/576 |
| 5,508,757 | 4/1996 | Chen | 348/818 |

*Primary Examiner*—Lynn D. Feild
*Attorney, Agent, or Firm*—Lyon & Lyon LLP

[57] ABSTRACT

A shade device that facilitates the viewing of the contents displayed on the notebook computer display screen includes a bracket for mounting the shade device to a monitor display assembly of a notebook computer, a top panel hingedly connected to the bracket, an upper right panel hingedly connected to the top panel, a lower right panel hingedly connected to the upper right panel and the bracket, an upper left panel hingedly connected to the top panel, a lower left panel hingedly connected to the upper left panel and the bracket, and a flap hingedly connected to the top panel. The shade device being fully expandable to shade the display screen of a notebook computer and collapsible into a flat surface that fits between the display screen and the keyboard when the monitor display assembly of the notebook computer is closed.

23 Claims, 7 Drawing Sheets

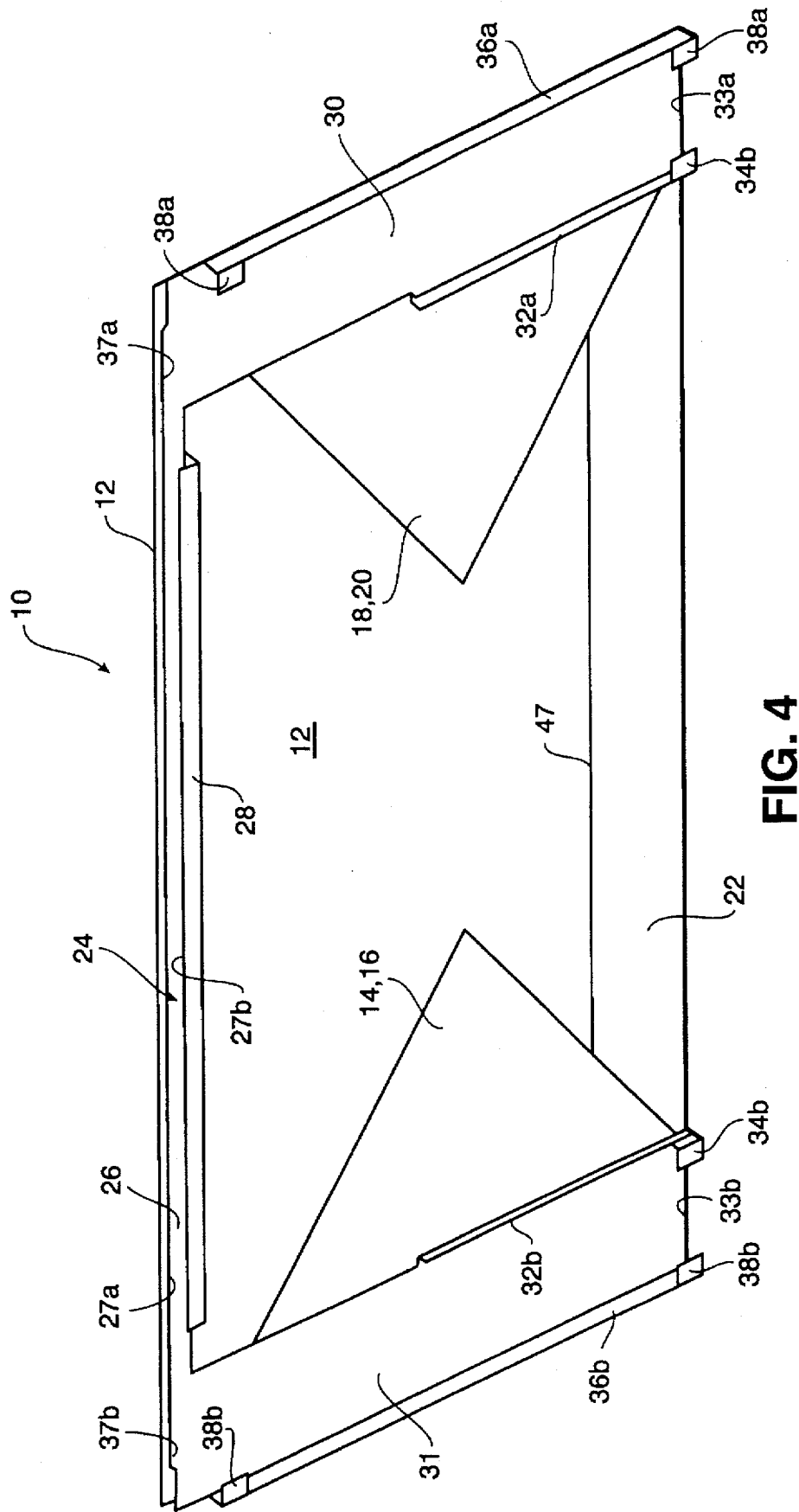

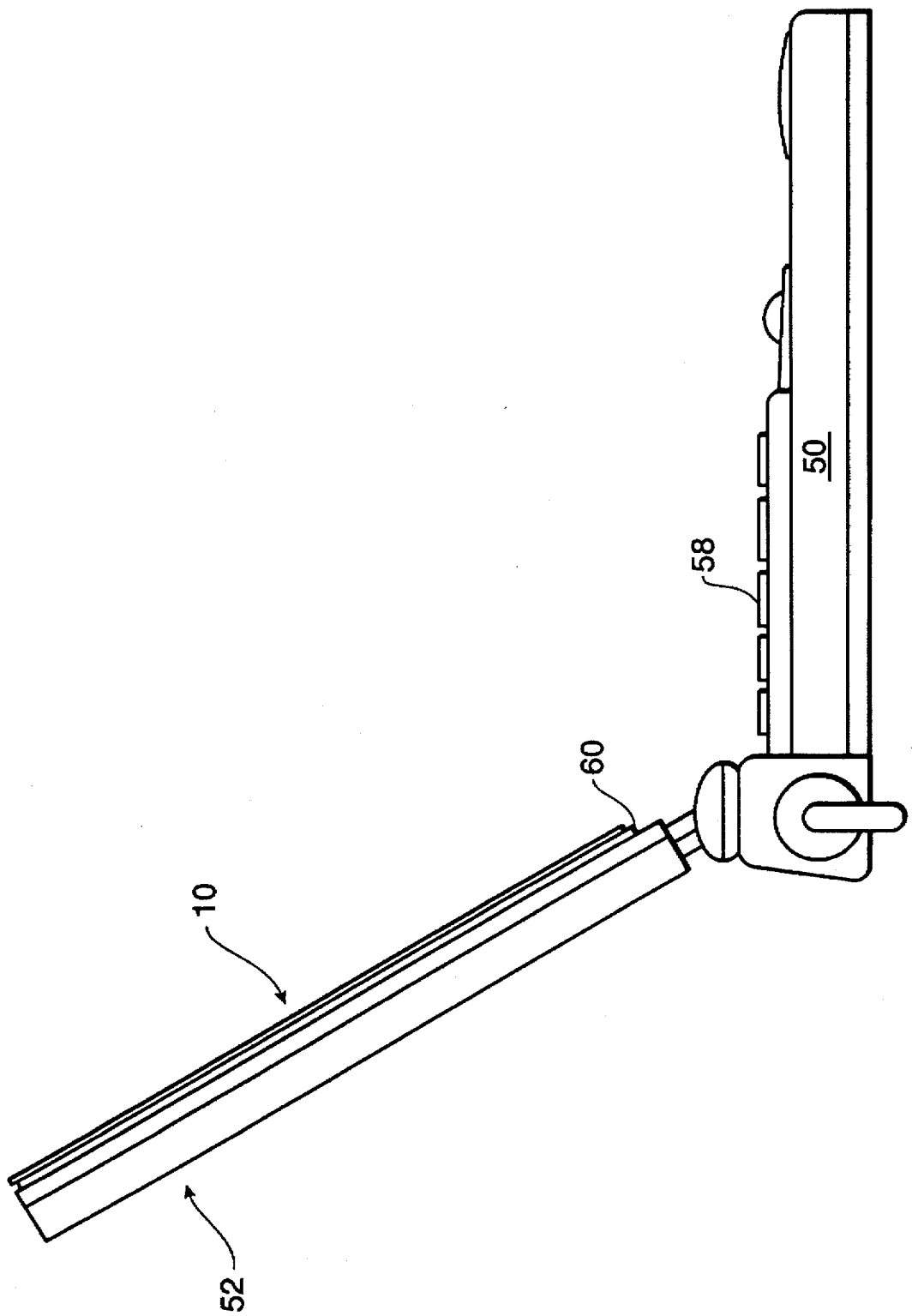

5,717,566

SHADE DEVICE FOR NOTEBOOK COMPUTER DISPLAY SCREEN

FIELD OF THE INVENTION

This invention relates to computer display screens, and more particularly to a shade device for notebook computer display screens that facilitates viewing in excessive light.

BACKGROUND OF THE INVENTION

The advent of the notebook computer has transformed many conventional offices into virtual offices. A user is now able to take the computer on the road with him and at any moment, anywhere, lift up the display screen, hit the power button and begin working on a spreadsheet, a letter, a facsimile, etc. As such computers become more powerful and more affordable, a greater number of users will begin to take advantage of the convenience and efficiency these computers offer.

Although these notebook computers are convenient to use in almost any locale, the viewing of the contents on a color display screen tends to be degraded or impeded by an excess of light such as that from sunlight or artificial lights. The excessive light tends to "wash-out" the color display and make it difficult for the user to view the screen contents. As a result of this "washout" effect, the computer user will attempt to adjust the screen settings, i.e., brightness or contrast, or adjust the position of the screen to obtain a clearer display.

Other attempts to deal with the "wash out" effect, include placing some sort of shroud or shade around the computer display screen. These solutions may be as simple as taping a piece of cardboard to or around the display screen or may include devices formed from some rigid material that attaches to the display screen to act as a shroud or shade.

Although effective, these solutions are inconvenient to a notebook computer user. It is not at all convenient for a notebook user to carry a piece of cardboard, or some other material, and attach it to the notebook computer display screen everything time the user wishes to use the notebook computer and then detach the shroud or shade when the user has finished working on the notebook computer.

Therefore, it would be desirable to have a device that enhances the viewing of the contents displayed on the notebook computer display screen, that blocks the excessive rays of light to prevent the color "wash out" effect on color display screens, that is convenient to use, and that is easily assembled and disassembled.

SUMMARY OF THE INVENTION

The shade device of the present invention serves to enhance the viewing of the contents displayed on the notebook computer display screen, block excessive rays of light that cause the color "wash out" effect on color display screens, and provide a device that is convenient to use and is easily assembled and disassembled. The shade device of the present invention comprises a bracket for mounting the shade device to a monitor display assembly of a notebook computer, a top panel hingedly connected to the bracket, an upper right panel hingedly connected to the top panel, a lower right panel hingedly connected to the upper right panel and the bracket, an upper left panel hingedly connected to the top panel, a lower left panel hingedly connected to the upper left panel and the bracket, and a flap hingedly connected to the top panel. When the shade device is fully expanded the top panel is supported by the upper right and left panels which are supported by the flap. The panels and the flap of the shade device are collapsible into a flat surface that fits between the display screen and the keyboard when the monitor display assembly of the notebook computer is closed.

An object of this invention is to provide an improved shade device for notebook computer display screens.

Further objects and advantages of the present invention will become apparent from a consideration of the drawings and ensuing description.

BRIEF DESCRIPTION OF THE DRAWINGS

FIG. 4 is an rear isometric view of the shade device in its computer collapsed or "shut down" configuration.

FIG. 6 is a side view of the shade device attached to a notebook computer monitor display assembly. The shade device is in its computer "shut down" configuration.

DESCRIPTION OF THE PREFERRED EMBODIMENT

Figure 1:
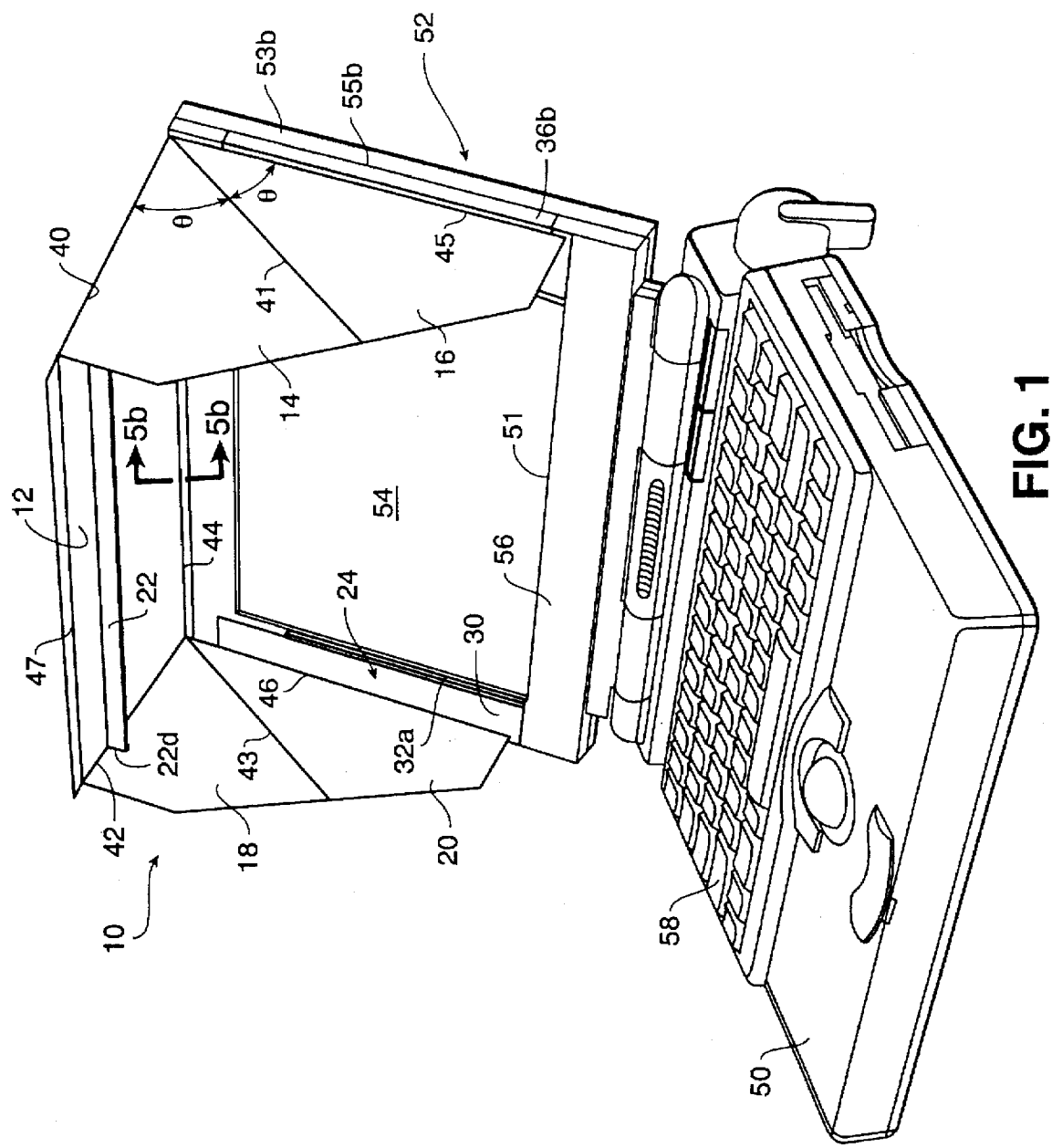
FIG. 1 is an isometric view of a novel shade device of the present invention attached to a notebook computer monitor display assembly.

Referring now in detail to the drawings, therein illustrated is a novel shade device for notebook computer display screens. Turning to the individual drawings in detail, FIG. 1 shows a shade device 10 of the present invention attached to a notebook computer display assembly 52 of a notebook computer 50 and formed as a shroud substantially surrounding a display screen 54 of the notebook computer 50.

Referring to FIGS. 1-4, the shade device 10 is shown to comprise a top panel 12, an upper right panel 14, a lower right panel 16, an upper left panel 18, a lower left panel 20, a flap 22 and a bracket 24 having top, left and right face plates 26, 30 and 31, respectively. It is preferable to construct the panels 12, 14, 16, 18 and 20, the flap 22 and the bracket 24 out of thin material such as sheet metal made from aluminum shim stock, model No. 2024-T3. The shim stock preferably has a thickness of 12 mil with memory.

The top panel 12 is substantially rectangular in shape with left and right side edges 12a and 12b and back and front edges 12c and 12d. The upper right panel 14, which is substantially triangularly shaped, has an upper edge 14a, a lower edge 14b and two front edges 14c and 14d. The upper right panel 14 is hingedly connected to the top panel 12 at the upper edge 14a of the upper right panel 14 and the right side edge 12b of the top panel 12. A hinge connection 40 is formed between the top and upper right panels 12 and 14 by preferably attaching a strip of polyester adhesive tape to both panels 12 and 14 along and adjacent the right and upper edges 12b and 14a. All other hinge connections 41, 42, 43, 44, 45, 46, 47 and 48 noted below are similarly preferably formed with thin tape material such as a polyester adhesive tape manufactured by 3M™, model No. 853. The tape preferably comprises a transparent polyester backing and acrylic adhesive.

The lower right panel 16 is a mirror image of the upper right panel 14. The lower right panel 16 comprises an upper edge 16a, a back edge 16b, a front edge 16c and a lower edge 16d. The lower right panel 16 is hingedly connected to the upper right panel 14 at hinge connection 41 formed along and adjacent to edges 16a and 14b and at an angle θ to both the upper edge 14a and the back edge 16b.

The upper and lower left panels 18 and 20, respectively, are mirror images of the upper and lower right panels 14 and 16, respectively, and thus, include an upper edge 18a, a lower edge 18b, two front edges 18c and 18d, an upper edge 20a, a back edge 20b, a front edge 20c and a lower edge 20d. A hinge connection 42 is formed along and adjacent to the upper edge 18a of the upper left panel 18 and the left side edge 12a of the top panel 12. Also, a hinge connection 43 is formed along and adjacent to the upper edge 20a of the lower left panel 20 and the lower edge 18b of the upper left panel 18 and at an angle θ to both the upper edge 18a and the back edge 20b.

Figure 2:
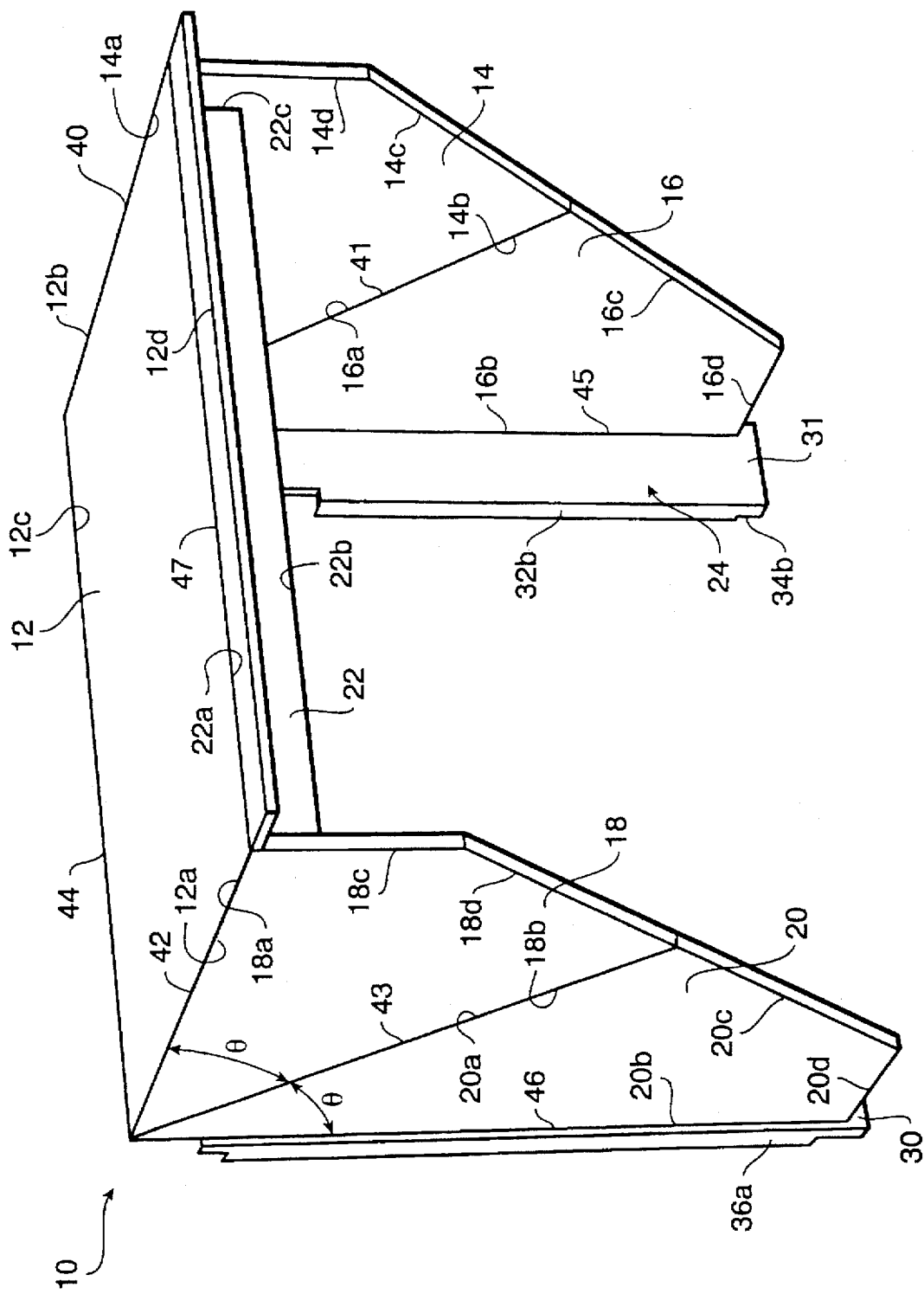
FIG. 2 is an isometric view of the shade device shown in FIG. 1.
Figure 3:
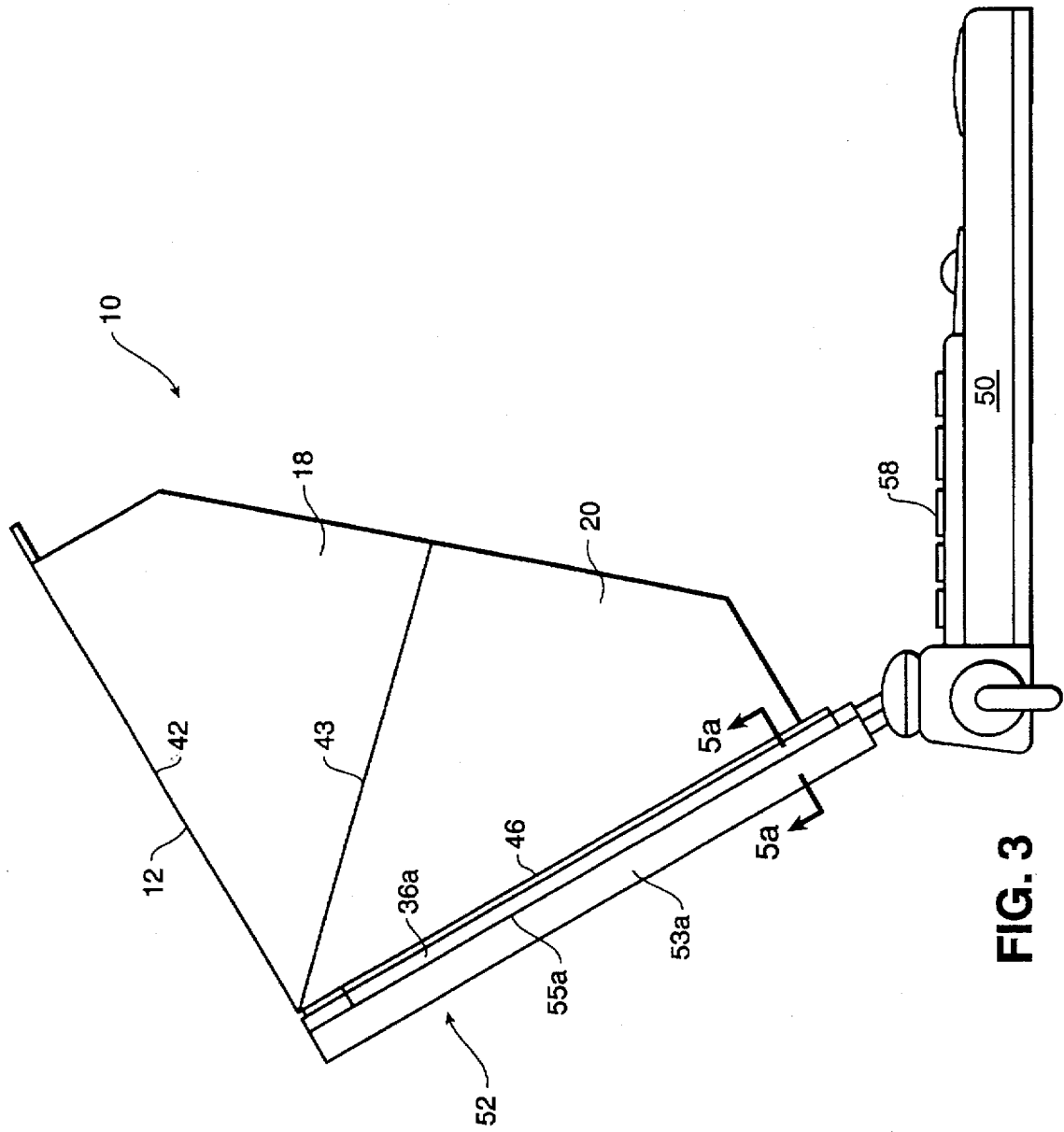
FIG. 3 is a side view of the shade device attached to a notebook computer monitor display assembly.

The elongated flap 22 is substantially rectangularly shaped having upper, lower and side edges 22a, 22b, 22c and 22d, respectively. The upper edge 22a of the flap 22 is hingedly connected to the top panel 12 at hinge connection 47 nearly adjacent and parallel to the front edge 12d of the top panel 12. While the shade device 10 is in its expanded or "operational" configuration, as shown in FIGS. 1–3, the flap 22 is oriented substantially perpendicularly to the top, upper right and upper left panels 12, 14 and 18, with its side edges 22c and 22d abutting the upper right and left panels 14 and 18, respectively. In this position, the flap 22 supports the upper left and right panels 18 and 14 and acts as a locking mechanism that keeps the shade device 10 fully open while in use.

Figure 7:
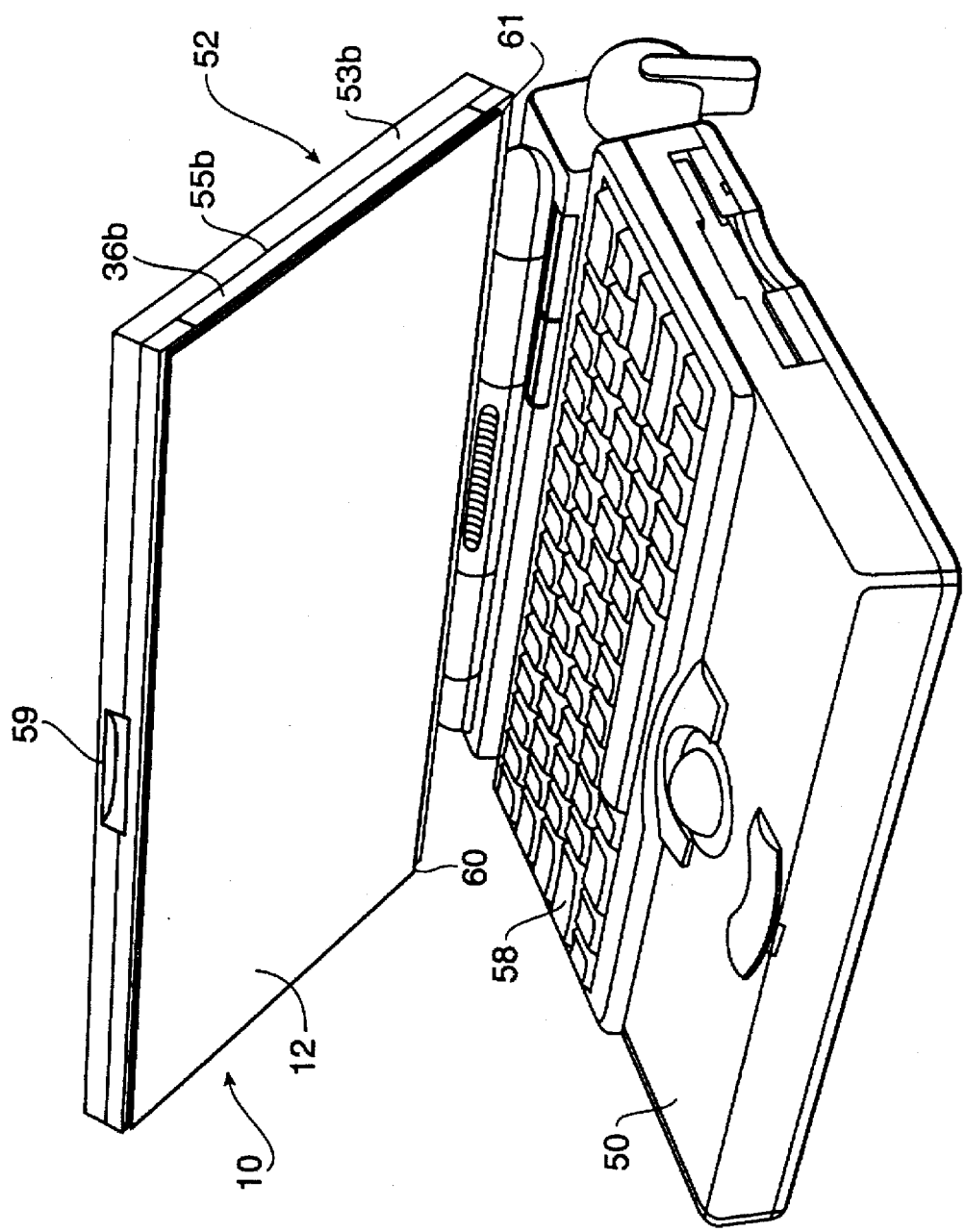
FIG. 7 is an isometric view of the shade device attached to a notebook computer monitor display assembly. The shade device is in its computer "shut down" configuration.

To collapse or return the shade device 10 to its "shut down" configuration, as shown in FIGS. 4, 7 and 8, the user must pull the flap 22 outwardly towards the front edge 12d of the top panel 12 until the flap 22 reaches a position that is substantially flat and parallel to the top panel 12. In this position, the flap 22 no longer supports the upper right and left panels 14 and 18 and, as a result, the right and left panels 14, 16, 18 and 20, respectively, fold inwardly along the hinge connections 40, 41, 42, 43, 45 and 46, and the top panel folds downwardly along the hinge connection 44 until the shade device 10 is substantially flat and parallel to the display screen 54.

The bracket 24 is substantially the shape of a squared off inverted "U" comprising a top face plate portion 26, and left and right face plate portions 30 and 31. The top face plate portion 26 has a top edge 27a that is hingedly connected at a hinge connection 44 to the back edge 12c of the top panel 12 and a bottom edge 27b that is folded over for the substantial length of the top face plate 26 to form an inverted "L" shaped grip 28. The left and right face plates 30 and 31 include inside and outside edges 32a, 32b, 36a and 36b respectively. The back edges 16b and 20b of the lower right and left panels 16 and 20 respectively, hingedly connect at hinge connections 45 and 46, respectively, to the right and left face plates 31 and 30 along and adjacent to the outside edges 36a and 36b of the right and left face plates 31 and 30, respectively.

Substantially half of the inside edges 32a and 32b of the left and right face plates 30 and 31 is folded over perpendicular to the face plates 30 and 31. Adjacent to the bottom edges 33a and 33b of the left and right face plates 30 and 31, for about ⅜" along the inside edges 32a and 32b, the inside edges 32a and 32b are folded over to form "L" shaped grips 34a and 34b.

For substantially the full height of the left and right face plates 30 and 31, the outside edges 36a and 36b are folded over perpendicular to the face plates 30 and 31, and for about ⅜" along the outside edges 34a and 34b adjacent to the top and bottom edges 37a and 37b and 33a and 33b of the face plates 30 and 31, the outside edges 34a and 34b are folded over to form "L" shaped grips 38a and 38b.

Figure 5B:
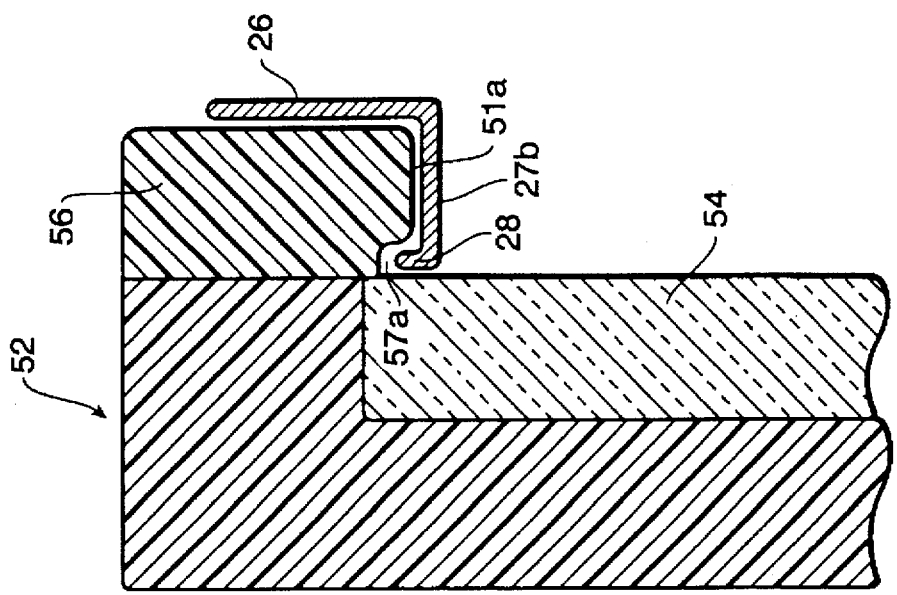
FIG. 5b is a partial cross-sectional view taken along line 5b—5b in FIG. 1.
Figure 5A:
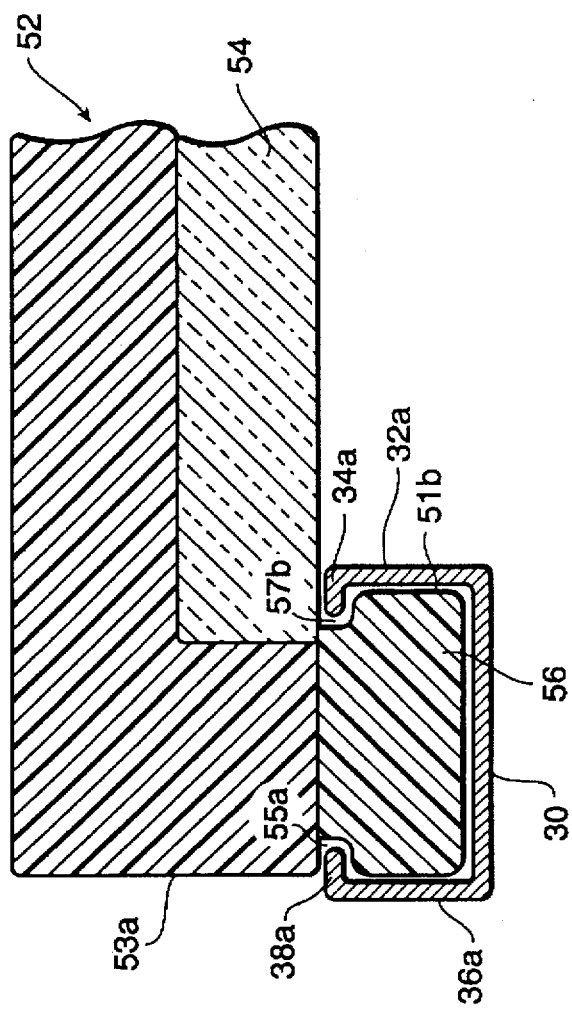
FIG. 5a is a partial cross-sectional view taken along line 5a—5a in FIG. 3.

To attach the shade device 10 to the monitor display assembly 52 of the notebook computer 50, the grip 28 formed along the bottom edge 27b of the top face plate portion 26 of the bracket 24 engages the upper inner edge 51a of the bezel 56 and slides into the gap 57a between the upper inner edge 51a of the bezel 56 and the display screen 54 (see FIG. 5a). The inside edges 32a and 32b of the left and right face plate portion 30 and 31 of the bracket 24 abut the left side inner edge 51b and right side inner edge (not shown) of the bezel 56 while the grips 34a and 34b engage the lower portion of the left side inner edges 51b and right side inner right edge (not shown) of the bezel 56 and slide into the left gap 57b and right gap (not shown) between the left side inner edge 51b and right side inner edge of the bezel 56 and the display screen 54 (see FIG. 5B). The outside edges 36a and 36b of the left and right face plate portions 30 and 31 of the bracket 24 abut the outside edges 53a and 53b of the bezel 56 while the grips 38a and 38b engage the outside edge grooves 55a and 55b in the outside edges 53a and 53b of the bezel 56 (see FIG. 5A). Once the grips 28, 34a, 34b, 38a and 38b have engaged the gaps and grooves 57a, 57b, 57c, 55a and 55b, the underside of the face plate portions 26, 30 and 31 of the bracket 24 are held in position substantially flat against the bezel 56.

In operation, when the display monitor latch 59 is released and the monitor display assembly 52 is manually raised, the shade device 10 is exposed. The shade device 10 is then easily assembled into its expanded or operational configuration by the user lifting the two outside lower corners 60 and 61 of the shade device 10 (see FIGS. 6 and 7). As the user lifts the two outside lower corners 60 and 61 and begins to raise the top panel 12, the flap 22 automatically folds down and then the upper and lower, right and left panels 14, 16, 18 and 20 expand and the upper right and left panels 14 and 18 become supported by the flap 22. The flap 22 then acts as a locking mechanisms that keeps the shade device 10 fully open while in use. The right and left panels 14, 16, 18 and 20 act as support for the top panel 12 of the shade device 10 and prevent it from collapsing.

In order to collapse the shade device 10 into its shut down configuration, the user pulls the flap 22 towards the user until it is substantially flat and parallel to the top panel 12. The left and right panels 14, 16, 18 and 20 collapse inwardly as the top panel 12 collapses downwardly until the shade device 10 folds neatly into a flat surface of less than about ¹⁄₁₆" in thickness and is parallel to the display screen 54 (see FIGS. 6 and 7). When the monitor display assembly 52 is fully closed, the shade device 10 fits inside the notebook computer 50 between the display screen 54 and the keyboard 58.

The construction of the shade device 10 advantageously enables the shade device 10 to be installed at all times and tends to eliminate any inconvenience to the user normally associated with attaching and assembling a computer screen shroud or shade.

In an alternate embodiment, the bracket 24 of the shade device 10 would not include the grips 28, 34a, 34b, 38a and 38b to engage the gaps and grooves 57a, 57b, 57c, 55a, and 55b on the monitor display assembly 52. Rather the bracket 24 would include an alternative means to attach the shade device 10 to the monitor display assembly 52. The alternatives may include a flange member (not shown) or an elastic member (not shown) that would extend around the backside of the monitor display assembly 52 to releasably attach the shade device 10 to the monitor display assembly 52. Such a configuration would enable the user to conveniently mount the shade device 10 to or dismount the shade device from the monitor display assembly 52 when the user begins or completes his work on the notebook computer 50. In operation, the shade device 10 of this alternate embodiment functions as discussed above.

Thus, the shade device of the present invention provides many benefits over the prior art. While the above description contains many specificities, these should not be construed as limitations on the scope of the invention, but rather as an exemplification of one preferred embodiment thereof. Many other variations are possible.

Accordingly, the scope of the present invention should be determined not by the embodiments illustrated above, but by the appended claims and their legal equivalents.

What is claimed is:

1. A shade device for notebook computers comprising
   a bracket,
   a first side panel hingedly connected to said bracket, said first side panel including an upper panel hingedly connected to a lower panel,
   a second side panel hingedly connected to said bracket, said second side panel including an upper panel hingedly connected to a lower panel,
   a top panel hingedly connected to said bracket, said top panel being supported by said first and second side panels when the shade device is fully expanded, and said top, first side and second side panels being collapsible into a flat surface, and
   a flap hingedly connected to said top panel, said flap abutting said upper panel of said first and second side panels when the shade device is fully expanded to hold the shade device in its expanded position.

2. The shade device of claim 1, wherein said upper panel of said first and second side panels is hingedly connected to said top panel.

3. The shade device of claim 1, wherein said lower panel of said first and second side panels is hingedly connected to said bracket.

4. The shade device of claim 1, wherein said bracket comprises a plurality of gripping members.

5. The shade device of claim 1, wherein said bracket, said first and second side panels, said top panel and said flap are formed from thin sheet metal.

6. The shade device of claim 5, wherein the sheet metal comprises aluminum shim stock.

7. The shade device of claim 6, wherein the aluminum shim stock is about 12 mil thick.

8. The shade device of claim 1, further comprising polyester tape to hingedly connect said bracket, first side panel, second side panel and top panel.

9. A shade device and monitor display assembly for notebook computers comprising
   a monitor display assembly pivotally connected to a computer body of a notebook computer, said monitor display assembly being movable between an open position and a closed position, said monitor display assembly being substantially parallel and adjacent to said computer body when in the closed position,
   a top panel hingedly interconnected to said monitor display assembly,
   a first side panel hingedly connected to said top panel, and
   a second side panel hingedly connected to said top panel, said top panel being supported by said first and second side panels when the shade device is fully expanded, and said top, first side and second side panels being collapsible into a flat surface adjacent said monitor display assembly, and interposed between said monitor display assembly and said computer body when said monitor display assembly is in the closed position.

10. The assembly of claim 9, further comprising a flap hingedly connected to said top panel.

11. The assembly of claim 9, further comprising a bracket hingedly connected to said top panel and attached to the monitor display assembly.

12. The assembly of claim 11, wherein said first and second side panels comprise an upper panel hingedly connected to a lower panel.

13. The assembly of claim 12, wherein said upper panel of said first and second side panels is hingedly connected to said top panel.

14. The assembly of claim 12, wherein said lower panel of said first and second side panels is hingedly connected to said bracket.

15. The assembly of claim 14, further comprising a flap hingedly connected to said top panel, said flap abutting said upper panel of said first and second side panels when the shade device is fully expanded.

16. The assembly of claim 11, wherein said bracket comprises a plurality of gripping members.

17. A shade device for notebook computers comprising
   a bracket,
   a first side panel hingedly connected to said bracket,
   a second side panel hingedly connected to said bracket,
   a top panel hingedly connected to said bracket, said top panel being supported by said first and second side panels when the shade device is fully expanded, and said top, first side and second side panels being collapsible into a flat surface, and
   a flap hingedly connected to said top panel, said flap abutting said first and second side panels when the shade device is fully expanded to hold the shade device in its expanded position.

18. The shade device of claim 17, wherein said bracket comprises a plurality of gripping members.

19. The shade device of claim 17, wherein said bracket, said first and second side panels, said top panel and said flap are formed from thin sheet metal.

20. The shade device of claim 19, wherein the sheet metal comprises aluminum shim stock.

21. The shade device of claim 20, wherein the aluminum shim stock is about 12 mil thick.

22. The shade of claim 17, further comprising polyester tape to hingedly connect said bracket, first side panel, second side panel and top panel.

23. A shade device and monitor display assembly for notebook computers comprising
   a top panel hingedly interconnected to a monitor display assembly,
   first and second side panels hingedly connected to said top panel, said first and second side panels including an upper panel hingedly connected to a lower panel, said top panel being supported by said first and second side panels when the shade device is fully expanded, and said top, first side and second side panels being collapsible into a flat surface, and a flap hingedly connected to said top panel, said flap abutting said upper panel of said first and second side panels when the shade device is fully expanded.

* * * * *